United States Patent
Davis et al.

(10) Patent No.: US 6,340,137 B1
(45) Date of Patent: Jan. 22, 2002

(54) MOMENT CONTROL UNIT FOR SPACECRAFT ATTITUDE CONTROL

(75) Inventors: Lawrence P. Davis; Tristam T. Hyde, both of Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/139,989

(22) Filed: Aug. 26, 1998

(51) Int. Cl.$^7$ ................................................ B64K 1/28
(52) U.S. Cl. ........................................ 244/165; 244/164
(58) Field of Search ................................. 244/164, 165

(56) References Cited

U.S. PATENT DOCUMENTS

| | | | |
|---|---|---|---|
| 3,493,194 A | * 2/1970 | Kurzhals | 244/165 |
| 3,741,500 A | * 6/1973 | Liden | 244/165 |
| 3,915,416 A | * 10/1975 | Anderson et al. | 244/165 |
| 3,999,729 A | * 12/1976 | Muhlfelder et al. | 244/165 |
| 4,012,018 A | * 3/1977 | Lorell et al. | 244/165 |
| 4,071,211 A | * 1/1978 | Muhlfelder et al. | 244/165 |
| 4,230,294 A | * 10/1980 | Pistiner | 244/170 |
| 4,375,878 A | * 3/1983 | Harvey et al. | 244/158 R |
| 4,662,178 A | * 5/1987 | Rasmusson | 60/721 |
| 4,723,735 A | * 2/1988 | Eisenhaure et al. | 244/165 |
| 5,058,835 A | * 10/1991 | Goodzeit et al. | 244/165 |
| 5,279,483 A | * 1/1994 | Blancke et al. | 244/165 |
| 5,476,239 A | * 12/1995 | Brainard | 244/171 |
| 5,611,505 A | * 3/1997 | Smay | 244/165 |
| 5,820,078 A | * 10/1998 | Harrell | 244/165 |
| 5,820,079 A | * 10/1998 | Harrell | 244/165 |
| 5,918,865 A |   7/1999 | Osterberg | 267/221 |
| 6,022,005 A | * 2/2000 | Gran et al. | 267/136 |
| 6,089,508 A | * 7/2000 | Noyola et al. | 244/165 |

FOREIGN PATENT DOCUMENTS

| DE | 3523160 | * 1/1987 | 244/165 |
|---|---|---|---|

* cited by examiner

*Primary Examiner*—Peter M. Poon
*Assistant Examiner*—Floris C Copier
(74) *Attorney, Agent, or Firm*—Charles J. Ungemach; Robert E. Greenstien

(57) ABSTRACT

A moment control device for positioning a spacecraft which employs a plurality of spinning bodies operable to impart a desired torque to a space craft, the bodies being constructed in a unitary combination and the unitary combination being mounted to the spacecraft to be positioned.

8 Claims, 2 Drawing Sheets

MOMENT CONTROL UNIT FOR SPACECRAFT ATTITUDE CONTROL

BACKGROUND OF THE INVENTION

1. Field of the Invention

The present invention relates to vehicle control and more particularly to attitude control apparatus for spacecraft. Yet more specifically, the present invention relates to a novel arrangement for reaction wheels (RW's), momentum wheels (MW's) and/or control moment gyros (CMG's) used to position a space vehicle and control its attitude.

2. Description of the Prior Art

RW's, MW's and CMG's have long been used to control the attitude of space craft. They were designed to replace reaction jets for cyclic type maneuvers and provided improved control, longer spacecraft life and reduced fuel requirements. In the prior art, a number, at least three and usually more for redundancy and fail safe operation, have been mounted at various locations about the spacecraft as dictated by volume, structure and thermal considerations and where sufficient space was available. The components, being remote from one another, have a number of disadvantages. For example, several boxes of electronics are required for each component and this introduces greater weight, volume, cost and heat generation. With the prior art each CMG, MW or RW has to be installed separately and many of the functions have to be calibrated and tested by the spacecraft integrator. The prior CMG art requires a gimbal rate sensor or tachometer which when combined with other data can be used to derive an approximation of the torque being delivered to the spacecraft. The sensor its self induces higher frequency signals which results in added and undesirable vibrations being transmitted to the spacecraft. Finally, the prior CMG art uses ring like mounting structures which are bolted to a plate structure in the spacecraft. This primarily two-dimensional structure is structurally inefficient. Each unit delivers torque to the spacecraft as its single function, but the net effect cannot be measured directly and efficiently. As will be shown, the present invention is more of a three-dimensional system having somewhat equal dimensions in all three spatial axes.

BRIEF DESCRIPTION OF THE INVENTION

The present invention overcomes the problems of the prior art by providing an integrated single unitary structure containing multiple spinning bodies, the electronics to control them and the intelligence to interface with the spacecraft on the sub-system level. Repackaging the system into a single integrated unit allows the manufacturer to design a single and more efficient structure to house the inner gimbal assemblies of the RW's, MW's or CMG's. With CMG's the outer gimbal base ring as a separate part, can be eliminated and the lower number of electronic boxes can be reduced resulting in reduced weight and the number of connections to the vehicle further reduces weight and improves heat conduction transfer to the outer surfaces of the vehicle. Further more, the unit manufacturer now has to deal with a single momentum control unit and, on delivery, the unit will be able to be plugged in to reduce the contractor cost and improve the spacecraft manufacturing schedule. The total volume occupied by the unitary structures will be smaller than that of separate mounted units. The arrangement and other design changes enabled by the grouping together converts the result into a higher level system offering many advantages including, better performance, the ability to measure the performance more accurately and more directly, lower weight, lower power, a smaller package, and lower cost. Using common circuits within the system reduces the number of electronic components. The number and resulting weight of cables and connector is also be reduced. Grouping them and adding a single six axes interfacing kinematics force measuring system, such as is proposed herein, enables a much more effective servo control system to regulate the resulting net torque and consequential motion of the spacecraft. This further enables the addition of a single isolation system as an integral part of the force measuring system to reduce or filter undesirable high frequency vibratory forces that are otherwise transmitted to the spacecraft. The present invention not only avoids this problem it also diminishes the effects of other sources of high frequency vibrations such as that caused by the bearings and rotor unbalance. The present invention allows the manufacturer to complete this process much more professionally before it leaves the factory and in parallel with the building of the spacecraft. By operating on a higher level set of requirements the manufacturer can relax sub-level requirement lowering his manufacturing cost. Installation into the spacecraft is much simpler. The result is lower spacecraft integrator cost and significantly reduced spacecraft manufacturing schedules which further reduces cost.

DETAILED DESCRIPTION OF THE PREFERRED EMBODIMENTS

Figure 1:
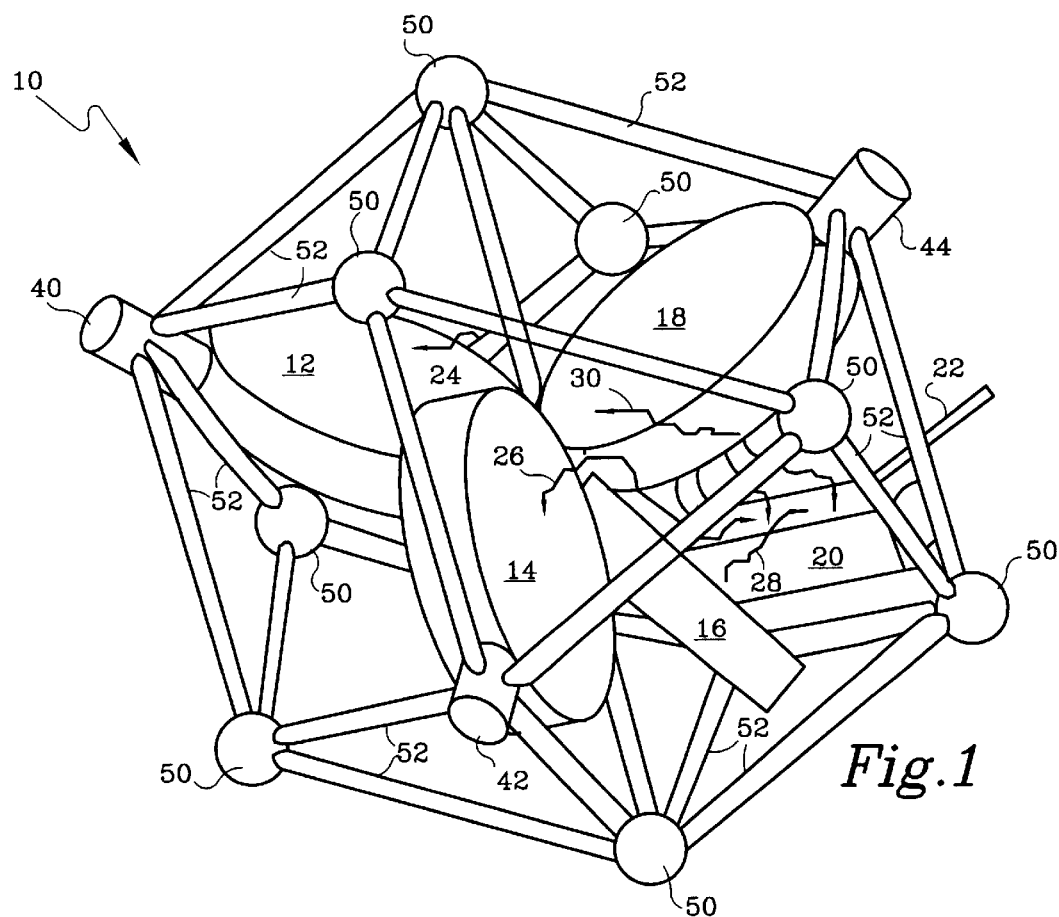
FIG. 1 is one preferred embodiment of a unitary structure of the present invention housing a plurality of control moment gyros.

Referring to FIG. 1, a unitary moment control unit (MCU) 10 is shown containing four control moment gyros (CMG's) identified by reference numerals 12, 14, 16 and 18. While the structure of MCU 10 is shown as a symmetrical 14 sided structure, other configurations are possible and while CMG's are used for the preferred embodiment, other rotating mass members such as reaction wheels or momentum wheels may be used. It should also be understood, that while four CMG's have been shown, fewer may be used. Three CMGs are necessary for three axis control and the fourth CMG is for redundancy. Also more than four CMG's may be employed for fail safe and fail operational functions. An electronic package 20 having an input connection 22 and providing connection to each of the CMG's is shown by connectors 24, 26 28 and 30. Having the electronics co-located with the CMG's reduces the amount of electronics required and allows the unit to be tested with all of the CMG's in place.

CMG 12 is mounted to the MCU 10 by a mounting member 40 on one end and by an unseen centrally located mounting member in a manner to be described in connection with FIG. 3. CMG 14 is mounted to the MCU 10 by a mounting member 42 on one end and by the unseen centrally located mounting member. CMG 18 is mounted to the MCU 10 by a mounting member 44 on one end and by the unseen centrally located mounting member. CMG 16 is mounted similarly to the others by two unseen mounting members.

The MCU is held in a rigid arrangement made up of a plurality of terminal members shown as spheres 50 and a plurality of elongated joining members 52. Electronics box 20 may be connected to one or more of the elongated members 52.

It is seen that the orientation of the CMG's is such that they do no lie on any axis in common. Thus, the torque imparted by the CMGs will be resolved into a three orthogonal axes arrangement by using vector addition of their individual torque's. In this manner the space craft to which the MCU is mounted, as will be described in connection with FIG. 2, will be oriented as desired. If an CMG fails, the fourth CMG may be used to supply any missing torque.

The mounting of the MCU 10 to the spacecraft is important in order to impart the necessary torque and to minimize emitted vibration. The mounting should also be kinematic to minimize strain due to temperature changes This may be accomplished by a strut type element which has relatively high stiffness along its longitudinal axis and relatively low stiffness in the other axes. Co-pending application of David Osterberg entitled Load Isolator apparatus filed Jan. 29, 1997 with Ser. No. 08/790,647 and assigned to the assignee of the present invention describes a load isolator damper arrangement which may be used. The number of struts used to mount the MCU is also important. One of the most stable ways to mount a structure is by a hexapod arrangement also known as a Stewart Platform as will be described in connection with FIG. 2.

Figure 2:
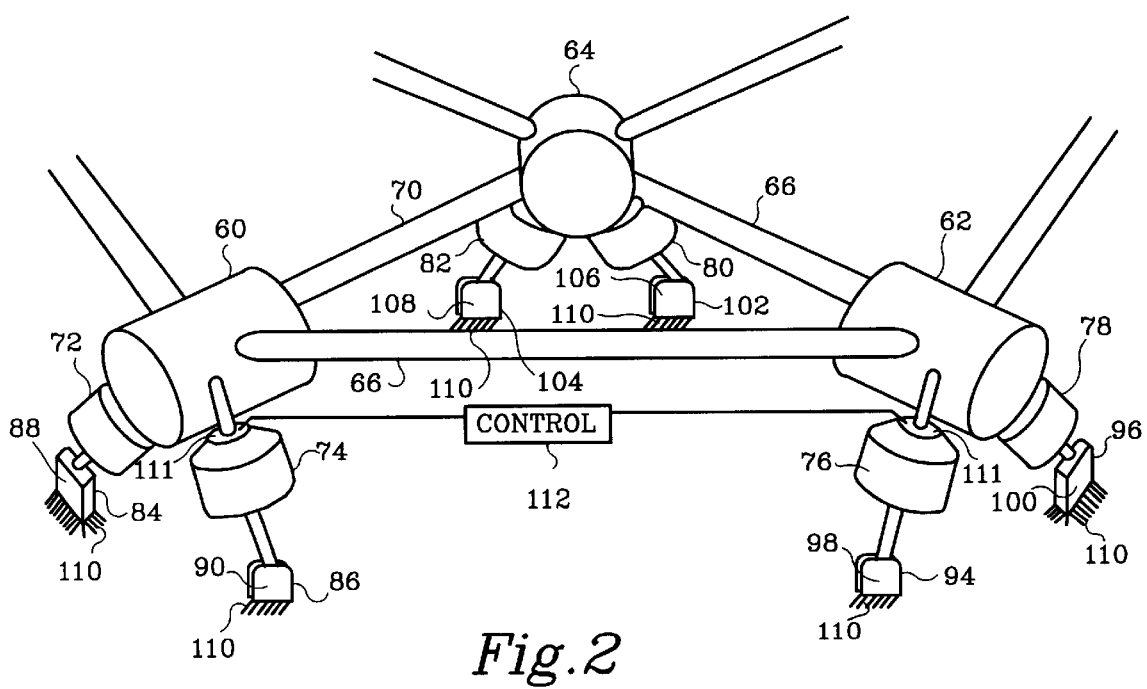
FIG. 2 is one preferred mounting structure attaching the unitary structure of FIG. 1 to a vehicle; and, FIG. 3 is another preferred embodiment of the unitary structure of the present invention.

In FIG. 2, a small portion of the structure of FIG. 1 is shown somewhat enlarged for clarity. Three mounting members 60, 62 and 64 which may be members such as shown as mounting members 40 of FIG. 1, are shown joined by elongated joining members 66, 68 and 70 which may be a suitable three of the joining members 52 of FIG. 1. A hexapod mounting consisting of six struts 72, 74, 76, 78, 80 and 82 are shown. Struts 72 and 74 each have one end connected to mounting member 60 while their other ends are pivotally connected to pivots 84 and 86 so as to be rotatable about axes 88 and 90 respectively. Struts 76 and 78 each have one end connected to mounting member 62 while their other ends are pivotally connected to pivots 94 and 96 so as to be rotatable about axes 98 and 100 respectively. Struts 80 and 82 each have one end connected to mounting member 64 while their other ends are pivotally connected to pivots 102 and 104 so as to be rotatable about axes 106 and 108 respectively. Pivots 84, 86, 94, 96, 102 and 104 are each connected to the spacecraft as shown by hatched lines 110. Struts 72, 74, 76, 78, 80 and 82 are designed to include a predetermined desired amount of static stiffness and passive damping. The passive isolation system becomes a mechanical low pass filter which transmits desired torque's to the spacecraft while eliminating unwanted higher frequency vibrations. Furthermore, the passive isolation system reduces structural and bearing loads during launch, reduces weight and power consumption and allows the use of smaller bearings which emit less vibration and can be operated at higher speeds while providing longer life. By tuning the spin rotor bearing mount and adding passive viscous damping at the interface, each CMG can provide damping and a measure of vibration isolation.

By using force sensors 111 within the struts and feeding the information to a control system 112 the precision of the torque transmitted can be improved. While only two force sensors 111 are shown connected to control 112 for simplicity, each of the struts 72–82 would be similarly connected. By controlling the actual forces emitted by the MCU array rather than from each CMG an increase of dynamic range and accuracy of the entire momentum control system can be achieved. Finally, an actuator can be added to each strut to provide an active isolation control capability. This can be used to lower the frequency with which isolation and torque control can be provided.

As mentioned, while a hexapod arrangement is preferable, there may be situations where it is more practical to use more mounting members. For example, if a rectangular package is used, and eight strut arrangement with two struts at each of four corners might be preferred.

Figure 3:
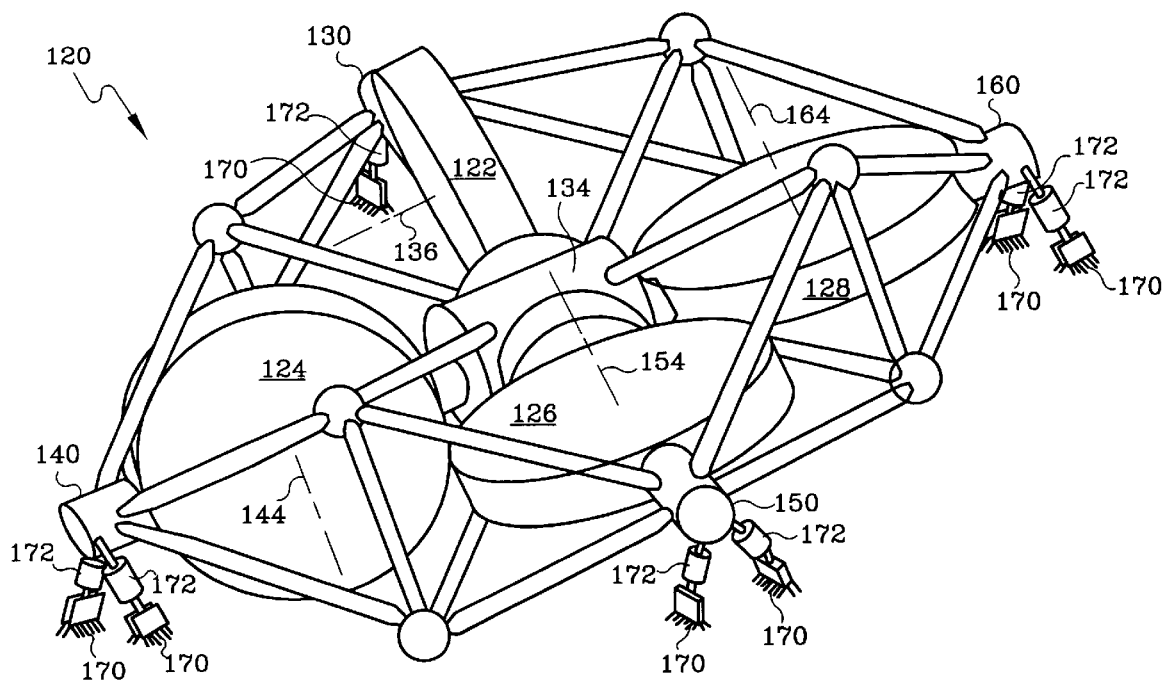

FIG. 3 shows an octopod mounting arrangement.

In FIG. 3, a unitary momentum control unit 120 is shown with four CMG's 122, 124, 126 and 128 mounted therein. CMG 122 is mounted at one end to a mounting member 130 similar to the mounting arrangement of FIG. 1. The other end of CMG 122 is mounted to a central mounting member 134 and the spinning mass therein (not seen) rotates about an axis 136. CMG 124 is mounted at one end to a mounting member 140 and the other end is mounted to the central mounting member 134 and its spinning mass (not seen) rotates about an axis 144. CMG 126 is mounted at one end to a mounting member 150 and the other end is mounted to the central mounting member 134 and its spinning mass (not seen) rotates about an axis 154. CMG 128 is mounted at one end to a mounting member 160 and the other end is mounted to the central mounting member 134 and its spinning mass (not seen) rotates about an axis 164. The structure of MCU 120 is otherwise like the structure of MCU 10 in FIG. 1 and will not be described further except to note that mounting members 130, 140, 150 and 160 are mounted to the spacecraft (shown by hash marks 170) by eight struts 172 with two at each corner. The struts 172 may be the same as described in connection with FIG. 2. The electronics box 20 of FIG. 1 has been omitted form FIG. 3 for purposes of clarity.

It is seen that the package comprising unitary MCU 10 is more spherical in general overall shape while the structure of the package of MCU 120 is more flat. Other shapes of structures may also be used so as to provide a shape best suited for the space availability of the spacecraft. It is seen that the unitary structure makes it easy for the manufacturer to test the dynamics of the system prior to mounting in the spacecraft and that a single mounting is all that is necessary to make it operational.

Many changes and modifications will occur to those having skill in the art. For example, as mentioned, the unitary structure is applicable to RW's and MW's as well as the CMG's used in the preferred embodiments. Accordingly, I do not wish to be limited to the specific structures used in connection with the preferred embodiments described herein.

The embodiments of the invention in which an exclusive property or right is claimed are defined as follows:

1. A momentum control device for positioning a spacecraft comprising:
   a plurality of bodies, each operable to spin about separate axes, to produce a plurality of forces;
   a unitary structure;
   mounting members connected to each spinning body and the unitary structure to provide a unitary combination to receive the forces;
   an attachment device comprising a plurality of struts having a predetermined static stiffness and passive damping connected to the unitary combination and adapted to be connected to the spacecraft to attenuate noise transmission from the bodies to the spacecraft and transmit the forces to the craft;
   a plurality of sensors operable to produce force signals indicative of the forces in said struts; and
   a control system connected to receive the force signals to control the operation of the spinning bodies in controlling the attitude of the spacecraft.

2. The momentum control device of claim 1 wherein the spinning bodies are control moment gyros and the control system is contained within the unitary combination.

3. The momentum control device of claim 1 wherein the struts are arranged as a hexapod.

4. The momentum control device of claim 1 wherein the struts are arranged as an octopod.

5. A method of mounting a plurality of spinable bodies to a spacecraft for imparting a desired torque to change the attitude of the spacecraft, comprising:

fastening a first of the plurality of bodies to a unitary mounting structure so as to allow the first body to spin about a first axis;

fastening a second of the plurality of bodies to the unitary mounting structure so as to allow the second body to spin about a second axis non-collinear with the first axis;

fastening a third of the plurality of bodies to the unitary structure so as to allow the third body to spin about a third axis non-collinear with the first or second axis;

fastening a plurality of struts having a predetermined static stiffness and passive damping between the unitary structure and the spacecraft so that forces are produced in the struts by the plurality of bodies to provide the desired torque and reducing transmission of unwanted frequency vibrations generated by the bodies to the spacecraft;

creating force signals representative of the forces applied through the struts to the spacecraft; and, installing a control system within the unitary structure to receive the force signals and control the operation of the bodies to produce said torque as a function of the force signals to change the attitude of the spacecraft.

6. A momentum control device for positioning a craft comprising:

a plurality of bodies each operable to spin about separate axes and to produce a torque, a unitary structure;

mounting members connected to each spinning body and to the unitary structure so as to provide a unitary combination for receiving the torques from the plurality of bodies;

a plurality of struts for connecting the unitary structure to the spacecraft to transmit the torques to the spacecraft, each strut comprising a force sensor to generate force information on the force transmitted to the spacecraft from the unitary structure through the strut; and a control system to receive the force information from the force sensors to control the operation of the bodies to change the attitude of the spacecraft as a function of the forces.

7. The momentum control device described in claim 6, wherein the control system is located within the unitary structure.

8. The momentum control device described in claim 6, wherein the struts contain damping means for attenuating the transmission of noise from the spinning bodies through the unitary structure to the spacecraft.

* * * * *